United States Patent
Breeze et al.

(10) Patent No.: US 11,108,206 B2
(45) Date of Patent: Aug. 31, 2021

(54) ROOM TEMPERATURE MASING USING SPIN-DEFECT CENTRES

(71) Applicants: IMPERIAL COLLEGE OF SCIENCE, TECHNOLOGY AND MEDICINE, London (GB); UCL BUSINESS LTD, London (GB)

(72) Inventors: Jonathan Breeze, London (GB); Neil Alford, London (GB); Juna Sathian, London (GB); Chris Kay, London (GB); Enrico Salvadori, London (GB)

(73) Assignees: IMPERIAL COLLEGE OF SCIENCE, TECHNOLOGY AND MEDICINE, London (GB); UCL BUSINESS LTD, London (GB)

(*) Notice: Subject to any disclaimer, the term of this patent is extended or adjusted under 35 U.S.C. 154(b) by 0 days.

(21) Appl. No.: 16/634,225

(22) PCT Filed: Jul. 26, 2018

(86) PCT No.: PCT/GB2018/052106
§ 371 (c)(1),
(2) Date: Jan. 27, 2020

(87) PCT Pub. No.: WO2019/021002
PCT Pub. Date: Jan. 31, 2019

(65) Prior Publication Data
US 2021/0091526 A1    Mar. 25, 2021

(30) Foreign Application Priority Data
Jul. 28, 2017 (GB) .................... 1712187

(51) Int. Cl.
*H01S 1/02* (2006.01)

(52) U.S. Cl.
CPC .................... *H01S 1/02* (2013.01)

(58) Field of Classification Search
CPC ........................................ H01S 1/02
See application file for complete search history.

(56) References Cited

U.S. PATENT DOCUMENTS

2017/0077665 A1* 3/2017 Liu .................. H01S 1/005

FOREIGN PATENT DOCUMENTS

| WO | 0178201 | 10/2001 |
|---|---|---|
| WO | 2013175235 | 11/2013 |

(Continued)

OTHER PUBLICATIONS

United Kingdom Search Report in corresponding UK appl. No. GB1712187.2, dated Jan. 26, 2018.

(Continued)

*Primary Examiner* — Jeffrey M Shin
(74) *Attorney, Agent, or Firm* — Kirschstein, Israel, Schiffmiller & Pieroni, P.C.

(57) ABSTRACT

Masing at room temperature is achieved by an apparatus and method that utilize a microwave cavity which exhibits a resonance of sufficiently high Q-factor for maser oscillation, and a resonator structure comprising a masing medium located within a resonant element. The masing medium comprises spin-defect centres. The resonator structure is disposed within the microwave cavity. A magnetic field is applied across the masing medium. An input of microwave radiation to be amplified is coupled to the resonator structure. An optical pump pumps the masing medium, thereby causing stimulated emission of microwave photons. The microwave cavity has an effective magnetic mode volume matching the volume of the masing medium.

19 Claims, 4 Drawing Sheets

(56) References Cited

FOREIGN PATENT DOCUMENTS

| WO | 2014027205 | 2/2014 |
| WO | 2016063047 | 4/2016 |
| WO | 2018051099 | 3/2018 |

OTHER PUBLICATIONS

International Search Report in corresponding international appl. No. PCT/GB2018/052106, dated Oct. 23, 2018.
Written Opinion in corresponding international appl. No. PCT/GB2018/052106, dated Nov. 6, 2018.
Oxborrow, et al., "Room-temperature solid-state maser", Nature, vol. 488, pp. 353-356, Aug. 16, 2012.
Breeze, et al., "Enhanced magnetic Purcell effect in room-temperature masers", Nature Communications, vol. 6:6215, DOI: 10.1038/ncomms7215, pp. 1-6, 2015.
Jin, et al., "Proposal for a room-temperature diamond maser", Nature Communications, vol. 6:8251, DOI: 10.1038/ncomms9251, pp. 1-8, 2015.
Loubser, et al., "Electron spin resonance in the study of diamond", Reports on Progress in Physics, vol. 41, pp. 1201-1248, 1978.
Poklonski, et al., "Inverted EPR signal from nitrogen defects in a synthetic diamond single crystal at room temperature",. JETP Letters, vol. 80, No. 12, pp. 748-751, 2004.
Poklonski, et al., "Nitrogen-doped chemical vapour deposited diamond: a new material for room-temperature solid state maser", Chinese Physics Letters vol. 24, No. 7, pp. 2088-2090, 2007.
Le Floch, et al., "Electromagnetic properties of polycrystalline diamond from 35K to room temperature and microwave to terahertz frequencies", Journal of Applied Physics, vol. 109, pp. 094103-1 to 094103-6, 2011.
Kraus, et al., "Room-temperature quantum microwave emitters based on spin defects in silicon carbide", Nature Physics, vol. 10, pp. 157-162, 2014.

\* cited by examiner

ROOM TEMPERATURE MASING USING SPIN-DEFECT CENTRES

FIELD OF THE INVENTION

The present invention relates to an apparatus and method for achieving masing at room temperature using a crystalline material containing spin-defect centres such as, but not limited to, diamond (which possesses charged nitrogen-vacancy centres) or silicon carbide (which possesses silicon-vacancy defects).

BACKGROUND TO THE INVENTION

The maser (Microwave Amplification by Stimulated Emission of Radiation) is the forerunner of the laser (Light Amplification by Stimulated Emission of Radiation), and was demonstrated around 1953 by Townes, Basov and Prokhorov who shared the 1964 Nobel Prize in Physics for this work. A laser can be thought of simply as a maser that works with higher frequency photons in the visible light spectrum, whereas a maser works at microwave frequencies. Both systems rely on chemical species with an excited energy-level population being stimulated into lower energy levels, either by photons or collisions with other species. Photons are coherently emitted by the stimulated atom or molecule, in addition to the original photons that entered the system at the same frequency, meaning that a strong beam of monochromatic radiation is produced.

Although lasers appeared after masers, they are manufactured in their billions and have found their way into applications in all sectors of industry and modern-day life from DVD players to laser eye surgery. Masers, on the other hand, are used only in very specialised applications such as atomic clocks and as amplifiers in radiofrequency telescopes.

Masing is fundamentally different from the amplification of electromagnetic waves by the flow of charge carriers in a vacuum (as with "thermionic valves/tubes"), or within semiconductors (as with solid-state "transistors"). Both "atomic" masers based on rarified atoms in what is otherwise a vacuum (e.g. ammonia molecules or hydrogen atoms) and "solid-state" masers based on solid dielectric crystals doped with paramagnetic ions (e.g. ruby) have been realized. Masers offer certain advantages in performance over alternative, more established technologies such as GaAs field-effect transistors (FETs) or InP high-electron-mobility transistor (HEMT) amplifiers and quartz-crystal oscillators.

A key reason why solid-state masers have not been widely adopted is that, to date, the maser process has generally only worked efficiently and continuously below a temperature of ~20K. Although the maser amplifier itself may be compact and consume modest power (milliwatts), to work at these very low temperatures it must necessarily operate within a bulky refrigerator/cryostat that either consumes hundreds of watts of electrical power (in the case of a cryomechanical cooler) or needs to be regularly fed with cryogenic fluid (the production of which itself consumes significant amounts of energy). In short, to date, masers have required bulky and power hungry apparatus in order to work under cryogenic conditions-particularly when providing continuous (rather than pulsed) masing.

There is therefore a desire to achieve masing (especially continuous masing, rather than pulsed) without the need for cryogenic cooling. Ideally it is desired to achieve masing without the need for any cooling whatsoever—i.e. at room temperature (around 293K).

Other disadvantages of conventional masers are as follows:

(i) The gain of a maser amplifier typically saturates at a low signal power (typically −40 dBm). They can thus only be used as (1st-stage) preamplifiers of weak signals, not as power amplifiers.

(ii) The magnets required to generate an applied magnetic field for a maser can be bulky and can (if a conventional copper-wire/ribbon electromagnetic is used) consume significant power (hundreds of watts). Thus, the rate at which the magnetic field can be slewed (for re-tuning the maser to work at a different frequency) is limited. Forsaking wide tunability, the use of superconducting electromagnets internal to the cryostat and/or (once the operating frequency is determined) the use permanent rare-earth magnets can both alleviate the resource cost of an external (non-superconducting) electromagnet. It is noted, in passing, that "zero-field masers", requiring no applied magnetic field, exist, but these only work (either as amplifiers or oscillators) over narrow bands (few tens of MHz) centred at particular frequencies (determined by the choice of paramagnetic species and host crystal).

By way of background art, recently a zero-field room-temperature solid-state maser was demonstrated by optically pumping a pentacene-doped p-terphenyl organic crystal housed within a sapphire dielectric resonator [1]. This maser required over 200 W of optical power to overcome the threshold for masing. This type of maser was subsequently improved and miniaturised by using high electrical permittivity strontium titanate as the dielectric resonator material [2]. Miniaturisation lowered the overall optical pump threshold by two orders of magnitude, yet the pump rate per molecule remained essentially the same. Both masers were only demonstrated in pulsed mode, where the maser bursts lasted 10-100 µs.

Further background art is provided in WO 2013/175235 A1, which discloses a device and method for generating stimulated emission of microwave or radio frequency radiation, e.g. to produce masing. Additional background art in respect of masing is provided in WO 2014/027205 A2.

SUMMARY OF THE INVENTION

Surprisingly we have found a means of achieving continuous masing at room temperature. According to a first aspect of the present invention there is provided apparatus as defined in Claim 1 of the appended claims, for achieving masing at room temperature. Thus there is provided apparatus for achieving masing at room temperature, the apparatus comprising: a microwave cavity which exhibits a resonance of sufficiently high Q-factor for maser oscillation; a resonator structure comprising a masing medium located within a resonant element, wherein the masing medium comprises spin defects within a crystalline material (such as, but not limited to, nitrogen-vacancy (NV) centres in diamond, or silicon vacancies in silicon carbide), the resonator structure being disposed within the microwave cavity; means for applying a magnetic field across the masing medium; an input of microwave radiation to be amplified, the input of microwave radiation being coupled to the resonator structure; and means (such as a laser) for optically pumping the masing medium and thereby causing stimulated emission of microwave photons; wherein the microwave cavity has an effective magnetic mode volume matching the volume of the masing medium.

By using a small cavity having an effective magnetic mode volume matching the volume of the masing medium, the optical power threshold for achieving masing is lowered significantly, and this also gives rise to a high magnetic Purcell factor (suitable for achieving masing at room temperature), the magnetic Purcell factor being proportional to the Q-factor divided by the magnetic mode volume. Indeed, by careful adjustment of the Q-factor, a greater amount of resonance may be achieved by matching the linewidths of the spin-resonance and cavity resonances. For example, overlapping the cavity resonance with all three of the resonance lines of NV-centres, as illustrated in FIG. 2, improves the ability to achieve masing.

Optional features are defined in the dependent claims.

Thus, the masing medium may comprise diamond containing charged nitrogen-vacancy spin-defect centres. Alternatively, the masing medium may comprise silicon carbide (SiC) containing silicon-vacancy ($V_{Si}$) spin-defect centres. Other crystalline materials containing high spin ($S>\frac{1}{2}$) defects may alternatively be used.

In a presently-preferred embodiment, the resonant element comprises a sapphire ring.

Preferably the masing medium is aligned such that an axis (e.g. the [111] direction) defined by the spin-defect centres is parallel to the applied magnetic field.

Particularly preferably the apparatus comprises means for adjusting the orientation of the masing medium within the microwave cavity when the microwave cavity is closed. Such means for adjusting the orientation of the masing medium may comprise, for example, a rotatable shaft on which the resonator structure is mounted. In a presently-preferred embodiment the rotatable shaft comprises a hollow tube (e.g. formed of quartz), the resonator structure is mounted at an end of the hollow tube, and the means for optically pumping the masing medium is arranged to provide the optical pumping along the hollow tube. Thus, the hollow tube provides a number of concurrent functions, including (i) supporting the resonator structure within the cavity; (ii) enabling the resonator structure (in particular the masing medium) to be rotated within the cavity when the cavity closed, in order to align the aforementioned axis defined by the nitrogen-vacancy centres parallel to the applied magnetic field; and (iii) providing a way of aligning the optical pumping (e.g. laser beam) with the masing medium.

By way of example, in a presently-preferred embodiment the microwave cavity is cylindrical, with a magnetic mode volume of the order of 0.1 cm$^3$. However, other geometries of the microwave cavity, and other mode volumes, are also possible.

To further increase the magnetic Purcell factor, the resonant element may further comprise a high permittivity dielectric or a metallo-dielectric structure such as a split-ring, hairpin or loop-gap structure.

Preferably the resonator structure is configured to address three spin-defect resonance lines of the spin-defect centres.

Preferably the means for optically pumping is configured to pump the masing medium into a triplet state.

To reduce the overall optical pumping power requirement, the apparatus may further comprise a mirror behind the masing medium, so as to double the path length of the optical pumping. Alternatively, the apparatus may further comprise two or more mirrors incorporating the masing medium and a laser crystal. Alternatively, the masing medium may be coated with a reflective material. In a further alternative, the means for optically pumping may be arranged such that the polarization of the incident light on the masing medium is p-polarized with respect to the plane of incidence of the masing medium, and the angle of incidence is at substantially the Brewster angle.

According to a second aspect of the present invention there is provided a method of producing masing at room temperature, the method comprising: disposing, within a microwave cavity which exhibits a resonance of sufficiently high Q-factor for maser oscillation, a resonator structure comprising a masing medium located within a resonant element, wherein the masing medium comprises spin-defect centres; applying a magnetic field across the masing medium; providing an input of microwave radiation to be amplified, the input of microwave radiation being coupled to the resonator structure; and optically pumping the masing medium and thereby causing stimulated emission of microwave photons; wherein the cavity has an effective magnetic mode volume matching the volume of the masing medium.

Optional features in respect of the method are as set out above in relation to the apparatus.

Thus, the masing medium may comprise diamond containing charged nitrogen-vacancy spin-defect centres. Alternatively, the masing medium may comprise silicon carbide containing silicon-vacancy spin-defect centres. Other crystalline materials containing high spin ($S>\frac{1}{2}$) defects may alternatively be used.

In a presently-preferred embodiment, the resonant element comprises a sapphire ring.

The method may further comprise aligning the masing medium such that an axis (e.g. the [111] direction) defined by the spin-defect centres is parallel to the applied magnetic field. The aligning may be performed when the cavity is closed, for example by rotating a shaft on which the resonator structure is mounted. In a presently-preferred embodiment the shaft comprises a hollow tube, the resonator structure is mounted at an end of the hollow tube, and the masing medium is optically pumped along the hollow tube.

By way of example, in a presently-preferred embodiment the microwave cavity is cylindrical, with a magnetic mode volume of the order of 0.1 cm$^3$. However, other geometries of the microwave cavity, and other mode volumes, are also possible.

Preferably the resonator structure addresses three spin-defect resonance lines of the spin-defect centres.

Preferably the optically pumping pumps the masing medium into a triplet state.

Advantageously, the masing may be continuous (rather than pulsed).

The method may further comprise a preliminary process of designing and manufacturing, or otherwise obtaining, the microwave cavity such that, in respect of a given masing medium, the microwave cavity exhibits a resonance of sufficiently high Q-factor for maser oscillation using the gain medium, the preliminary process comprising: measuring the sample volume of the masing medium and the concentration of spin-defect centres within the masing medium to estimate the optical pumping rate required; and designing and manufacturing, or otherwise obtaining, the microwave cavity with dimensions such as to give a small effective magnetic mode volume similar to the volume of the masing medium, and in which the masing medium can be mounted within the resonant element. The concentration of spin-defect centres affects the spin dephasing rate ($2/T2^*$) which contributes to the linewidth of the spin resonance. This is important for trying to match the linewidths of the cavity and the spin resonance. When the cavity and spin resonance linewidths are dissimilar then, depending on which is narrower, a number of cavity photons or spin will exist in what are referred to as 'dark states', i.e. they are not interacting. The concentration also allows the absolute number of defect centres to be estimated, which then governs how much optical pumping power is required.

To reduce the overall optical pumping power requirement, the method may further comprise doubling the path length of the optical pumping using a mirror behind the masing medium. Alternatively, the method may further comprise arranging two or more mirrors to incorporate the masing medium and a laser crystal. Alternatively, the method may further comprise coating the masing medium with a reflective material. In a further alternative, the optically pumping may be such that the polarization of the incident light on the masing medium is p-polarized with respect to the plane of incidence of the masing medium, and the angle of incidence is at substantially the Brewster angle.

Further aspects of the present invention provide a method and apparatus substantially as herein described with reference to and as illustrated in any combination of the accompanying drawings.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

Figure 1:
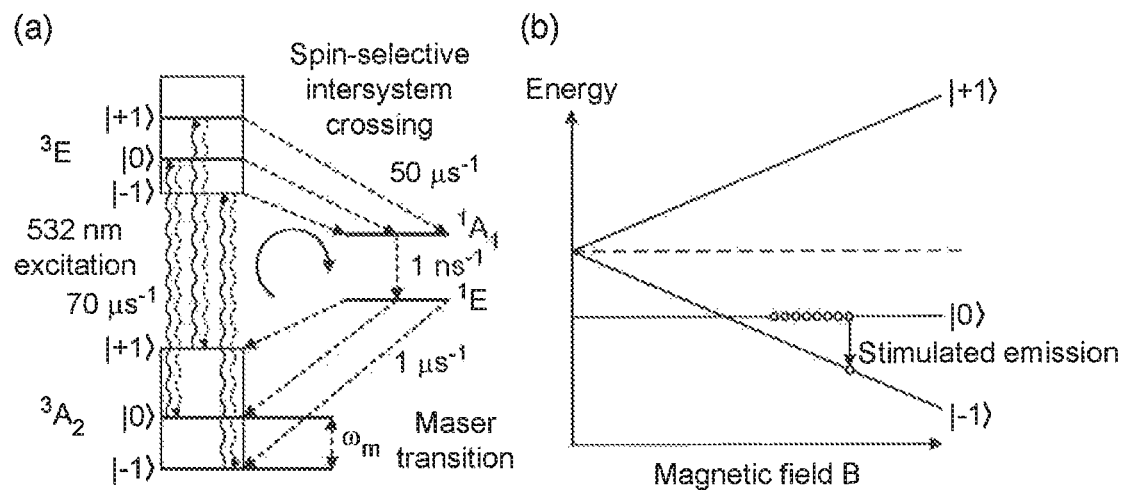
FIG. 1 illustrates (a) a spin-selective optical pumping process, and (b) Zeeman splitting of NV-centre triplet states by a magnetic field.

The present embodiments represent the best ways known to the applicants of putting the invention into practice. However, they are not the only ways in which this can be achieved.

The present embodiments employ a microwave cavity which exhibits a resonance of sufficiently high Q-factor for maser oscillation; and a resonator structure comprising a masing medium located within a resonant element, wherein the masing medium comprises spin-defect nitrogen-vacancy centres. For the masing medium, although the embodiments described below primarily use diamond as a source of nitrogen-vacancy centres, other materials, such as silicon carbide, may alternatively be used to provide high spin state $(S>\frac{1}{2})$ defects.

Background Information-Nitrogen-Vacancy Centres

A nitrogen-vacancy (NV) centre is a point defect in the diamond lattice. It consists of a nearest-neighbour pair of a nitrogen atom, which substitutes for a carbon atom, and a lattice vacancy. An NV centre is an example of a spin-defect centre. Other spin-defect centres include, for example, silicon-vacancy defects in silicon carbide.

Following almost 50 years of research, NV centres in diamond find potential application in quantum technologies including quantum computing, quantum metrology etc., due to their unique optical and spin properties. They are very stable chemically and optically, have high quantum efficiency at room temperature, and are much more stable than say pentacene (see e.g. WO 2013/175235 A1) in a typical matrix. The NV centres have very long relaxation times and can be polarized by light very efficiently, thus making them suitable candidates for realising room-temperature masers.

Despite the fact that achieving masing using NV centres in diamond at room temperature has been suggested as theoretically possible (e.g. by Jin et al. [3]; see also [4,5,6]), to date the use of NV centres in diamond to achieve room temperature masing has not been successfully realised. It is believed that one of the many reasons for this is that it is hard to implement, due to the requirement of a magnetic field which is higher than the zero-field splitting, as there is no inverse population in the zero field. There is also the difficulty of aligning the N-V centre axes within the diamond crystal relatively precisely with the magnetic field. Further difficulties arise in respect of obtaining resonators of sufficiently high Q and a low mode volume; and the small volume of commercially-available diamonds.

More particularly, synthetic (CVD or HPHT grown) diamonds containing charged nitrogen-vacancy centre (NV) defects are promising candidates for realising room-temperature masers. NV centres have triplet ground states which can be polarised by optical pumping even in zero-field. Optically excited $|m_s=\pm1\rangle$ triplet-states undergo spin-selective intersystem crossing into metastable singlet states which then decay preferentially by spin-selective intersystem crossing back to the $|m=0\rangle$ triplet ground states. The optically excited $|m_s=0\rangle$ states mostly decay back to their triplet ground-states and do not contribute significantly to the polarization build up. Due to the light-driven spin-selective intersystem crossing, the triplet ground states become spin polarized, i.e. the spin populations do not follow the Boltzmann distribution. Continuous optical pumping in zero field results in the $|m_s=0\rangle$ states becoming mostly populated (~80%) and the $|m_s=\pm1\rangle$ states becoming depleted. However, the population is not inverted (which stimulated emission requires) since the $|m_s=0\rangle$ states lie below the $|m_s=\pm1\rangle$ states in energy (by ~2.87 GHz).

The optical pumped spin-polarization process, when a magnetic field is applied, is shown in FIG. 1a.

In order to generate an inverted population, a static magnetic field is applied parallel to an axis defined by the nitrogen-vacancy (which is commensurate with that of the diamond structure). Zeeman splitting of the quasi-degenerate $|m=\pm1\rangle$ states, puts the $|m=-1\rangle$ state below the $|m=0\rangle$ state, effecting a population inversion as shown in FIG. 1b. At zero-field the $|m=\pm1\rangle$ states are degenerate and lie 2.87 GHz above the m=0> states. A static magnetic field of 1025 G (102.5 mT) brings the $|m=-1\rangle$ state down to be aligned with the $|m=0\rangle$ state. Further increasing the magnetic field can tune the energy difference between the $|m=0\rangle$ and

|m=−1> states. For example, a magnetic field of 4450 G (445 mT) produces a splitting of 9.6 GHz between the upper and lower states. If the diamond NV centres are placed within a suitable microwave resonator with resonant frequency of 9.6 GHz, stimulated emission will occur. No stimulated emission can occur for applied fields lower than 1025 G (102.5 mT), but above this threshold any emission frequency can be generated by appropriate selection of the applied magnetic field and resonator.

Masing

In order for masing to occur, the sample containing the NV centres should be placed within a suitable microwave resonator at a location where the microwave magnetic field is strongest, such as the centre of a $TE_{011}$ mode cavity. The resonator characteristics permit the exponential growth of microwave photons due to stimulated emission and allow a continual population inversion to be sustained. The microwave resonator must have a resonant frequency that equals the frequency difference between the upper and lower states of the inversion and the resonator must have a magnetic Purcell factor that is high.

The magnetic Purcell factor is proportional to the resonator quality factor and inversely to the magnetic mode volume:

$$F_m \propto \frac{Q}{V_m}$$

where $F_m$ is the magnetic Purcell factor, $V_m$ is the magnetic mode volume and $Q$ is the quality factor. A higher magnetic Purcell factor will make masing more likely and also reduce the optical pumping power requirement.

There are two routes available (separately or together) for increasing the magnetic Purcell factor: decreasing the magnetic mode volume; and increasing the quality factor (the so-called "high-Q" route). Jin et al. [3] have proposed using a sapphire resonator, substantially identical to that reported in the first room-temperature maser [1]. As was shown in [2], using a strontium titanate dielectric resonator can increase the magnetic Purcell factor by several orders of magnitude by significantly reducing the magnetic mode volume, thus reducing the sample size and also the optical pumping power requirement. However, since the frequency of a NV-centre diamond maser can be tuned by the externally placed magnetic field, higher frequencies will result in a smaller mode volume due to smaller wavelengths.

Note: The Number of Available NV-Centres-Hyperfine Coupling with Nitrogen

Given a number N of NV-centres in a sample, due to the cubic crystal symmetry of diamond and the necessity of applying a static magnetic field along the axis of an NV centre (vector between the N and the vacancy), then only ¼ of the available centres will be useful to the maser. There is however, another factor that reduces this to 1/12. This is the hyperfine coupling to nitrogen nuclei which splits the spin resonance into a triplet of lines separated by a few MHz. This is discussed in greater detail in the following section, in relation to the high-Q route as proposed by Jin et al. [3].

Disadvantages of High-Q Route (as Proposed by Jin et al. [3])

The diamond NV-centre based room-temperature maser proposed by Jin et al. [3] pursues the high-Q route to achieve masing. They use sapphire as a dielectric resonator, which has the lowest microwave losses (and hence highest Q) of any dielectric material. The Q-factor for their proposed resonator at 3 GHz was reported to be in the region of 50,000. The Q-factor is the quotient of the resonator frequency (f) and its linewidth ($\Delta f$), $Q=f/\Delta f$. This would result in a linewidth $\Delta f$ of 60 kHz. Since the hyperfine splitting between each of the three resonance lines is approximately 900 kHz (1.8 MHz total) and each line has an FWHM (full width at half maximum) of 800 kHz (the FMHM depending on the NV concentration, among other things), this means that only one of the resonance lines will be addressable, since the resonator mode's narrow linewidth will not be able to overlap with more than one spin resonance. This effectively reduces the number of addressable resonance lines by a factor of 3.

Figure 2:
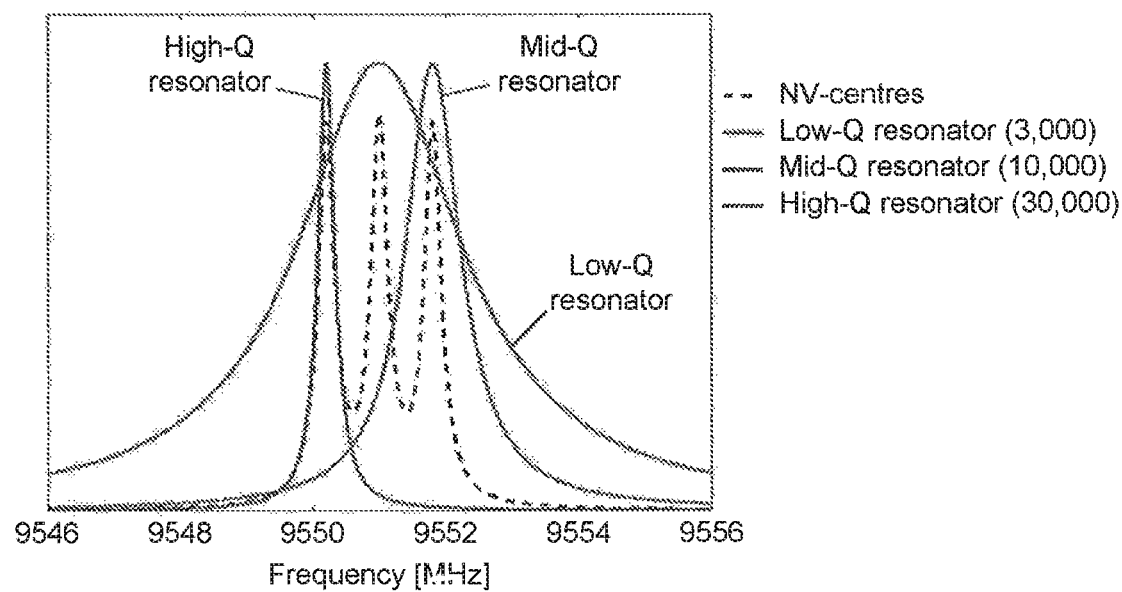
FIG. 2 shows NV resonance lines being addressed by low, medium and high Q-factor resonators.

To illustrate this, FIG. 2 shows the three resonance lines of NV-centres, split due to hyperfine coupling with Nitrogen $^{14}$N nuclei. A high-Q resonator (30,000) only partially overlaps with one of the resonance lines. A mid-Q resonator (10,000) overlaps an entire resonance line and a little of a second line. On the other hand, a low-Q resonance (3,000) would overlap with all three of the resonance lines.

The large physical dimensions of the sapphire resonator also require that the NV-diamond sample should be relatively large. This is problematic since artificial diamonds are generally quite small and no larger than 1 cm³. The minimum optical pumping rate of the NV centres is approximately proportional to their number N multiplied by the relaxation rate of the inversion (spin-lattice relaxation rate), and so would increase the optical pumping power threshold significantly.

The narrow line-width of the maser resonator and the NV-centre resonances places a strict limit on the homogeneity of the applied magnetic field. Field inhomogeneity will cause broadening of the observed spin resonance, due to there being a distribution of 'spin packets' with resonant frequencies dictated by the local magnetic field.

Figure 3:
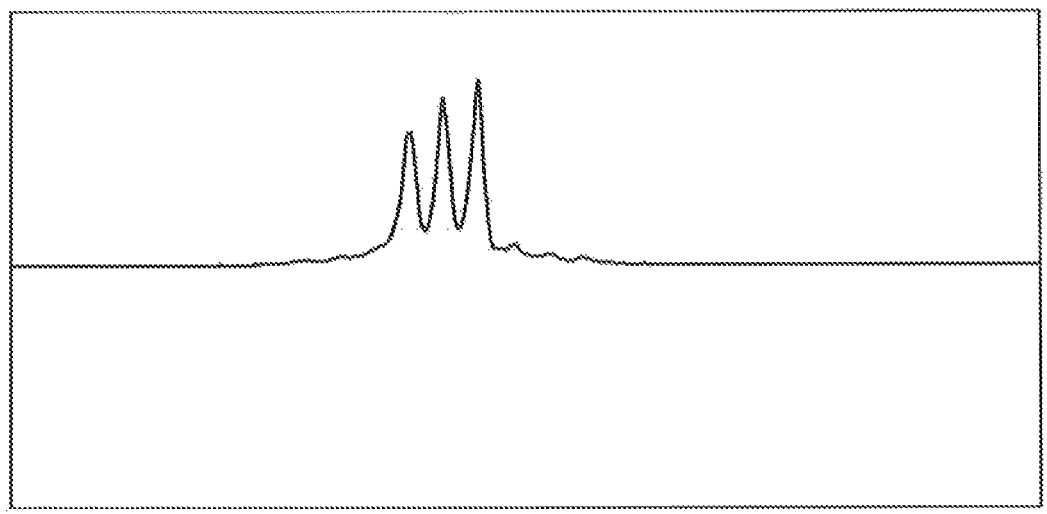
FIG. 3 is a photograph of an electron paramagnetic resonance field sweep trace showing stimulated emission from diamond NV-centre triplets at 9.5 GHz and room-temperature under 200 mW continuous-wave illumination by a 532 nm Nd:YAG frequency-doubled laser.

FIG. 3 is a photograph of an oscilloscope trace showing stimulated emission from the NV-centre triplets at 9.5 GHz and room-temperature under 200 mW continuous-wave illumination by a Nd:YAG laser of 532 nm wavelength. This experiment was conducted using a Bruker electron paramagnetic resonance (EPR) spectrometer.

In summary, the disadvantages of the high-Q approach proposed by Jin et al. [3] are:
Only 1/12 of available NV centres are active due to hyperfine coupling to N and the four equivalent axes of NV centres in diamond.
Large physical size, due to low frequency, requires a large diamond sample.
Large diamond sample size (and thus higher number of NV centres) requires high optical pumping power.
Strict limits on homogeneity of externally applied magnetic field.
Whilst a magnetic field aligned with an NV centre axis splits the |m=±1> states by the Zeeman effect, by the required amount, so that under optical pumping a population inversion is created, the other three off-axis NV centre axes are also subject to Zeeman splitting. For a specific range of external magnetic fields ~1000 G (100 mT), this may result in cross-relaxation between the energy levels of those NV centres and the masing NV centre energy levels. This is detrimental to the operation of the maser and would effectively reduce the lifetime of the population inversion. The frequency of operation chosen by Jin et al. of 3 GHz and the magnetic field required ~2100 G (210 mT), lies close to this region.

More Detailed Critique of Jin et al. [3]

Although the diamond maser concept proposed by Jin et al. [3] is feasible, the present inventors are of the view that the theoretical treatment in Jin et al. contains a fundamental error and a few other mistakes.

The authors of the Jin paper treat the equilibrium population of the triplet ground state as comprising a mostly populated lower level ($m_s=-1$), the upper maser level ($m_s=0$) being mostly depopulated and the non masing level ($m_s=+1$) playing no part in either the spin-dynamics or the optical spin-polarization process. This would be correct if the system was either at cryogenic temperatures, where the equilibrium Boltzmann populations would yield such a situation, or if the energy difference between the masing levels was much greater than the thermal energy, i.e. at optical frequencies. However, neither of these is the case.

This fundamental mistake makes much of their subsequent theoretical analysis invalid, specifically their estimates of the optical pump threshold for maser amplification and oscillation.

At room-temperature and at equilibrium, the populations of the $m_s=-1,0,+1$ ground-state triplet sub-levels follow Boltzmann distributions and are almost equally populated with slight differences dictated by the energy gap between levels and their temperature.

One important result of this is that it is easier to create a population inversion since the optical pumping power required in order for there to be a greater population in $m_s=0$ than $m_s=-1$ is very much smaller. During our experiments, we found as expected that without any optical pumping (dark), the population of the $m_s=-1$ was slightly greater than that in $m_s=0$, resulting in absorption of incident microwaves. However, a relatively low optical pump power of ~15 mW (provided by a 532 nm continuous-wave laser), perturbed the populations by spin-polarization, sufficiently for the populations to be equal and thus show neither emission nor absorption. By increasing the optical pump power above this level, we observed continuous emission from the NV-centres, which essentially means that more microwave power emerged from the NV-centres than was incident, i.e. maser amplification. This is interesting in itself, but it should be pointed out that the noise temperature and gain if used as a maser amplifier would not be particularly useful. Equal populations translate into infinite (negative) spin-temperatures and near unity amplifier gain. The noise temperature of a maser amplifier would depend on the magnitude of the spin-temperature and gain with other sources of noise in the device. The spin-temperature is given by:

$$T_s = -\frac{\hbar\omega}{k_B \log\left(\frac{n_e}{n_g}\right)}$$

where it is evident that the lowest magnitude occurs for the case of strongly inverted populations.

By neglecting the upper non-masing $m_s=+1$ level and the Boltzmann population distributions at room temperature, Jin et al.'s estimate of the pumping rate w required to promote an electron to the upper masing level $m_s=0$ of 4w was underestimated. A full analysis of the spin-polarization dynamics yielded a factor of ~16w, thus their estimate was almost a factor of 4 underestimated.

In the maser rate equations of Jin et al., their implementation of the spin-lattice relaxation rate was also incorrect. They modelled it as a process similar to spontaneous emission whereby an electron in the upper masing level drops down to the lower level, but neglecting that during spin-lattice relaxation there are also transitions from the lower state to the upper state.

Summary of errors in Jin et al. [3]:
Room-temperature non-Boltzmann equilibrium populations in ground-state triplet, resulting in inaccurate estimates of amplification/oscillation thresholds.
Underestimate of required optical pumping by factor of ~4.
Spin-lattice relaxation rate not accounted for properly.

The Present Approach (High Magnetic Purcell Factor, with Small Effective Magnetic Mode Volume)

In the present work we take a "high magnetic Purcell factor" approach based on a small effective magnetic mode volume, rather than seeking to achieve a high Q-factor alone. By using a small resonator with an effective magnetic mode volume matching the volume of the masing medium, the optical power threshold for achieving masing is lowered significantly. In addition, using a lower Q-factor, and hence a larger linewidth of the resonator, allows all three NV⁻ lines to be addressed (as illustrated in FIG. 2), further lowering the base threshold for maser amplification by a factor of 3.

Overview of Maser Resonator Apparatus

Figure 4:
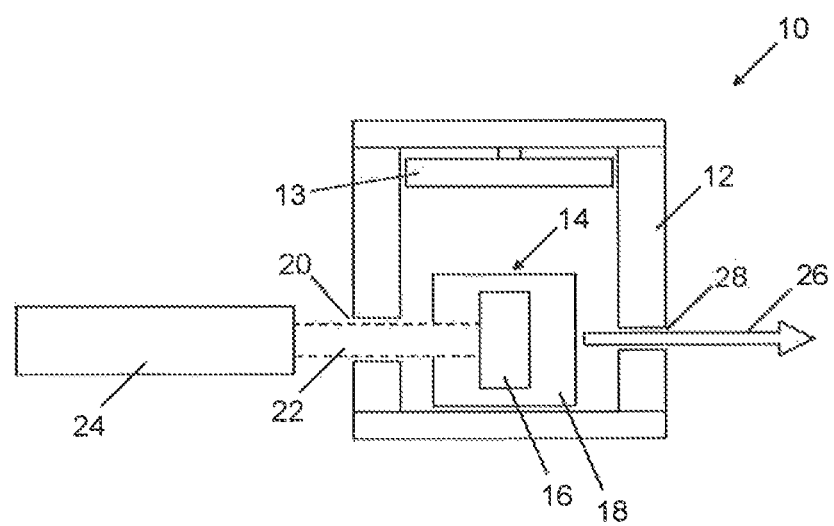
FIG. 4 illustrates a schematic diagram of a dielectric-resonator type maser (not to scale)

FIG. 4 schematically illustrates a resonator apparatus 10, broadly similar to those discussed in WO 2013/175235 A1, from which the present work is a development.

An outer casing 12 (e.g. made of copper) defines a cavity therein. Within the cavity (i.e. within the outer casing 12) is a resonator structure 14 that includes a masing medium 16 disposed within a resonant element 18.

The outer casing 12 has an inlet 20 through which the resonator structure 14 can receive a beam of light 22 (preferably in the visible spectrum) provided by a light source 24 acting as optical pumping means.

Also provided is an input source of electromagnetic radiation (not illustrated), at microwave frequency, coupled to the resonator structure 14 and to be amplified by the resonator structure 14 in order to produce a maser output.

The beam of light 22 acts as an input of energy to pump the resonator structure 14, in particular the masing medium 16, to cause stimulated emission of microwave photons, producing output microwave radiation which is coupled (magnetically or electrically) to a transmission line 26 via an outlet (iris) 28 or coupling device in the outer casing 12.

The light source 24 may be a laser, a laser diode, a light emitting diode, or a flash/arc lamp. Typical wavelengths of the beam of light 22 from the light source 24 are in the range of approximately 532 nm (e.g. for pumping diamond with nitrogen-vacancy centres) to approximately 808 nm (e.g. for pumping silicon carbide with vacancy defects).

Alternatively, or in addition, the light source 24 may comprise a luminescent concentrator, for example as disclosed in WO 2016/063047 A1. The disclosed luminescent concentrator device has an optical emission spectrum that almost matches the absorption spectrum of NV⁻ centres and would be a good way of delivering the continuous optical power required by the diamond in order to polarize the ground state triplet states.

The transition frequency of the triplet state of the masing medium 16 may be tuned by the application of a magnetic field B to the masing medium. The magnetic field may be provided by a permanent magnet such as ferrite or rare-earth (NdFeB, SmCo), or by passing an electric current through a coil in close proximity to the masing medium.

The outer casing 12 may be provided with an adjustable top wall 13 (which, though advantageous, is by no means essential). The adjustable top wall 13 enables the resonant frequency of the overall resonator structure to be tuned, by moving the adjustable wall 13 towards or away from the masing medium 16 and the resonant element 18. Alternatively, or in addition, a tuning screw may be provided-that is, a screw or post with a variable extent of penetration into the electromagnetic field of the resonator structure, the extent of penetration being adjustable in order to tune the resonant frequency.

Overview of Diamond Maser

Figure 5:
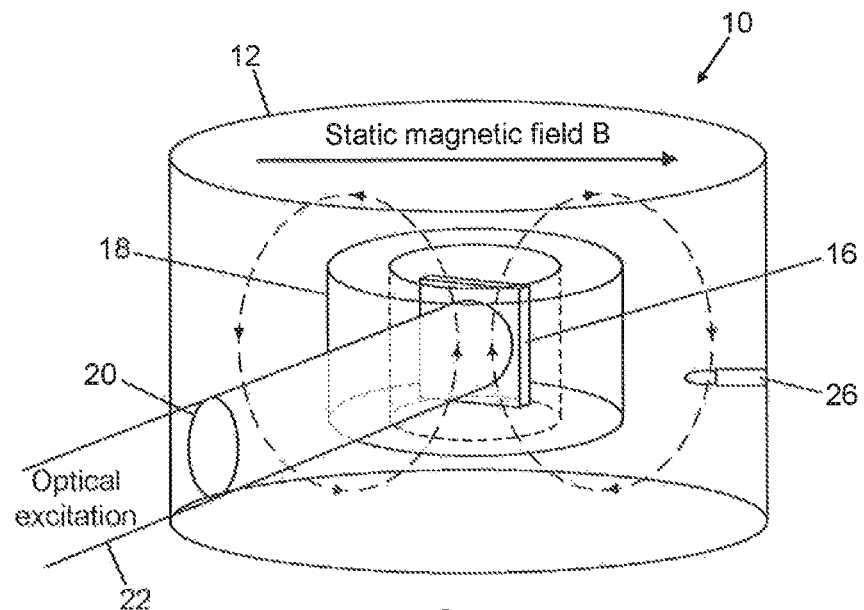
FIG. 5 illustrates an example of a dielectric-resonator type maser as used in the present work (not to scale), with a sapphire ring as the resonant element and a diamond (containing NV centres) as the masing medium.

Based on the principles of FIG. 4, FIG. 5 shows the dielectric-resonator type configuration used in the present work. The outer casing 12 of the resonator apparatus 10 is made of copper. The resonant element 18 is a sapphire ring. Disposed within the resonant element 18, the masing medium 16 is a diamond containing $NV^-$ centres. Together, the resonant element 18 and the masing medium 16 form a resonator structure (14 in FIG. 4).

A coupling iris/antenna 26 is arranged to provide microwave energy input/output in the vicinity of the resonator structure (i.e. within the field region indicated by the dashed lines in the figure, in which coupling can take place).

A laser beam 22 (having a wavelength of 532 nm) is used to pump the resonator structure, in particular the masing medium 16, to cause stimulated emission of microwave photons, producing output microwave radiation which is coupled to a transmission line 26. A static magnetic field B is applied, parallel to an axis defined by the $NV^-$ centres, to satisfy the condition of stimulated emission for masing. As mentioned above, the magnetic field B may be provided by a permanent magnet such as ferrite or rare-earth, or by using an electromagnetic coil.

Figure 6:
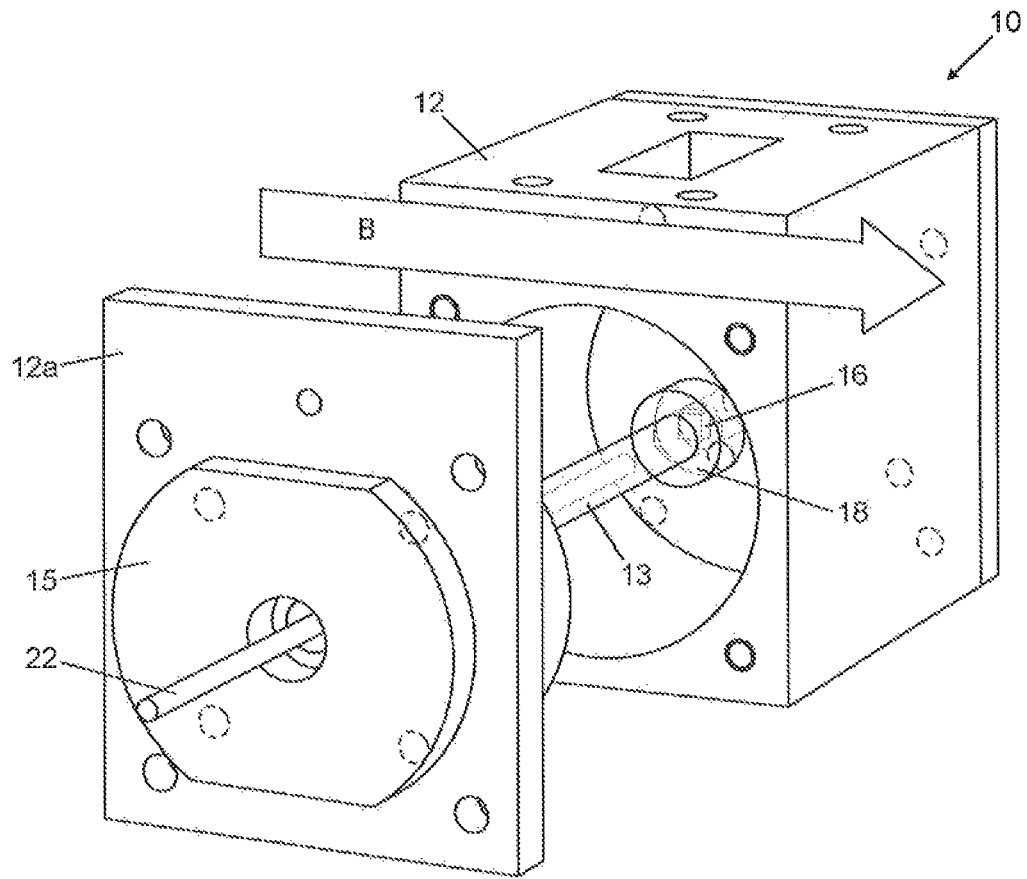
FIG. 6 illustrates a working example of a dielectric-resonator type maser as used in the present work, again with a sapphire ring as the resonant element and a diamond (containing NV centres) as the masing medium.

Current Embodiment of Working Example of Continuously-Operating Room-Temperature Diamond Maser FIG. 6 illustrates a diamond maser assembly 10 that represents a working example of a continuously-operating room-temperature diamond maser. A cylindrical cavity 12 manufactured from a high electrical conductivity metal (in this case oxygen-free copper) houses a hollow quartz tube 13 onto which is threaded, at one end, a dielectric resonator 18 consisting of a single-crystal sapphire ring. (In the illustration, a side wall 12a of the cavity 12 is shown in a partially removed position, so that the inside of the cavity can be seen.) As the masing medium, a diamond 16 containing $NV^-$ centres is held inside the sapphire ring resonator 18. Together, the dielectric resonator 18 and the diamond masing medium 16 form a resonator structure.

The quartz tube 13 with the sapphire/diamond parts 18, 16 is free to rotate about the cylindrical axis of the cavity 12, and is held in place by rotatable collets 15 at either end of the cavity 12. Thus, the quartz tube 13 acts as a rotatable shaft for the resonator structure, enabling the orientation of the resonator structure (and the masing medium 16 in particular) to be adjusted when the cavity is closed. Accordingly, as discussed further below, this enables the masing medium 16 to be aligned such that an axis defined by the nitrogen-vacancy centres is parallel to an applied magnetic field.

A coupling iris/antenna (26 in FIG. 5; not shown in FIG. 6) is arranged to provide microwave energy input/output, in the vicinity of the resonator structure.

The diamond masing medium 16 is optically pumped by a laser beam 22 (continuous wave, of wavelength 532 nm) down the hollow axis of the quartz tube 13. A static magnetic field B is applied, parallel to an axis defined by the NV-centres, to satisfy the condition of stimulated emission for masing.

In more detail, the cylindrical axis of the cavity 12 (diameter 36 mm, length 18 mm) is preferably oriented horizontally. Along the axis of the cylindrical cavity 12, the hollow quartz tube 13 (5 mm diameter) supports the single-crystal sapphire ring resonator 18 (10 mm outside diameter, 5.1 mm internal diameter, length 6 mm). The diamond masing medium 16 (containing NV centres, supplied by Element Six, grown by CVD and estimated to have ~0.05 ppm $NV^-$) is situated inside the sapphire ring resonator 18 and is cut, polished and aligned such that the [111] direction of the diamond (along an NV axis) lies in the plane perpendicular to the cylindrical axis.

The resonant frequency of the maser is 9.2 GHz and its unloaded quality factor (Q-factor) is 56,000. The mode volume of the resonator is 0.3 $cm^3$ and the magnetic Purcell factor is in the region of $2 \times 10^5$ $cm^{-3}$. A magnetic field B up to 5000 G (4300 G nominal) is applied across the cavity 12. The cavity 12 is interrogated by microwaves through either a single coupling iris or an antenna (loop or probe).

Electron paramagnetic resonance (EPR) spectroscopy can be employed in order to align the [111] direction of the diamond masing medium 16 (i.e. along an NV axis) parallel to the magnetic field B. This can be done by manually rotating the quartz/sapphire/diamond tube assembly until a maximum field splitting of 2050 G (between the lowest and highest absorption lines and equal to twice the zero-field splitting) is achieved. At this point the NV centres along the other three diamond crystal directions coalesce.

Once the diamond masing medium 16 is aligned with the magnetic field B, the laser beam 22 (continuous-wave, 532 nm wavelength, 2 mm spot size, up to 15 W power) is carefully aimed at the diamond 16 by being directed along the hollow centre of the quartz tube 13. The orientation and position of the laser beam 22 is adjusted using translational stages and mirrors with micro-adjusters. The power of the laser is kept low (a few 100 mW) and again EPR can be used to optimize the polarization, position and direction of the laser beam by optimizing the EPR signal.

Once all alignment is complete, the maser cavity 12 is disconnected from the EPR spectrometer and connected to a spectrum analyser (super-heterodyne receiver) for detecting maser oscillation or in conjunction with a circulator and attenuated microwave source for detecting amplifier gain.

Figure 7:
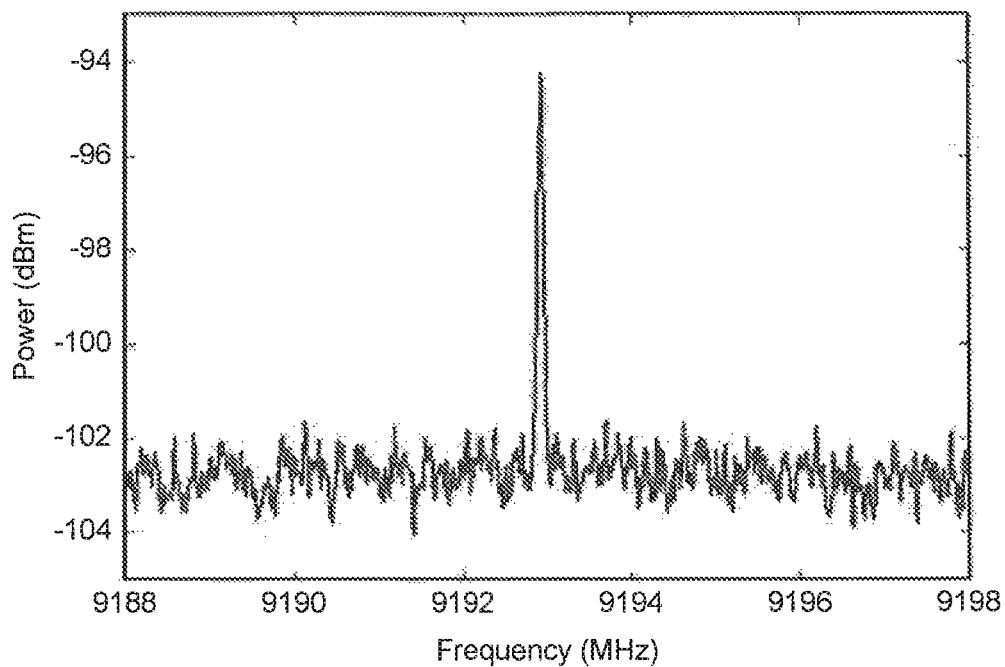
FIG. 7 shows measured continuous maser oscillation from the NV-centre diamond/sapphire maser of FIG. 6.

FIG. 7 shows measured continuous maser oscillation from the NV-centre diamond/sapphire maser of FIG. 6. It can be seen that, for a laser power of 0.4 W, the diamond maser exhibited continuous maser oscillation at 9.19 GHz. The output power was −94 dBm.

Further Discussion in Respect of Achieving a Relatively High Q-Factor

As mentioned above, the present copper cavity/sapphire/diamond maser has a relatively high 0-factor of ~56,000. This was developed to improve upon the inherent Q-factor of the Bruker electron paramagnetic resonance (EPR) spectrometer which we had been using in order to align the applied magnetic field with an axis defined by the nitrogen-vacancy centres; the inherent Q-factor of this spectrometer was of the order of 8,000 and too low to achieve masing from certain diamond samples with which we were working.

The parameters that enabled our maser to work were a relatively high Q-factor, and a small magnetic mode volume (thereby giving a high magnetic Purcell factor). It is possible to define a lower limit for the Q-factor. Based upon the assumption that the spin-spin dephasing time is inversely proportional to nitrogen concentration (as has been observed experimentally), the lower limit of the Q-factor becomes solely proportional to the ratio of the mode volume to sample volume. In the case of mode volume being equal to sample volume and the pump rate w being much greater than the spin-lattice relaxation rate y, the lowest possible Q-factor is approximately 560. In practice, due to artificial diamonds having volumes of the order of 10 mm³, achieving parity mode volume is challenging. The sapphire resonator had a mode volume of approximately 400 mm³, thus leading to a factor of 400/10=40 increase in the critical Q-factor for masing (23,000). If, for example, the resonator were to be constructed from high-permittivity BMT (barium magnesium tantalate) with relative permittivity ~25 (leading to a smaller mode volume of 20 mm), then the critical Q-factor would be ~1.500.

To sum up: the critical Q-factor is mostly dependent on the ratio of mode volume to sample volume. It should be noted that a mode volume smaller than the sample volume is not beneficial.

Power Considerations

If the diamond has a low concentration of nitrogen-vacancy centres then the power required for masing is lower; however, only a fraction of the incident optical power is absorbed. This has the advantage of uniform excitation. For a more concentrated sample, most of the incident power is absorbed, but the excitation and hence pump rate may be inhomogeneous.

Cavity Design and Maser Fabrication Methodology

The present work includes the following method for designing and manufacturing (or otherwise obtaining) a cavity for producing room-temperature masing, to suit a given masing medium which contains nitrogen-vacancy centres (such as a crystal of diamond or silicon carbide).

Step 1: Obtain a crystal (e.g. diamond or silicon carbide) containing nitrogen-vacancy centres or other high-spin ($S>\frac{1}{2}$) defects, that is to act as the masing medium.

Step 2: Measure the sample volume of the crystal (i.e. the masing medium) and the concentration of nitrogen vacancy centres within the crystal via optical spectroscopy or EPR relaxation measurements. This yields the number of nitrogen vacancy defect centres, which sets the lower limit for optical pumping power.

Step 3: Manufacture (or otherwise obtain) a cavity formed of a high electrical conductivity metal (e.g. oxygen-free copper), dimensioned so as to give a small effective magnetic mode volume matching the volume of the masing medium, and in which the masing medium can be mounted within a resonant element (e.g. a sapphire ring).

If the concentration of nitrogen vacancy centres was inferred from EPR measurements of T2, then this would reveal the spin resonance decay rate. The ideal cavity would have a decay rate equal to this for maximum overlap between their resonance lineshapes, i.e. maximal number of spins and photons interacting. For example, a T2 of 20 μs would give a spin decay rate of 0.1 μs. To match this in terms of cavity decay a Q-factor of 570,000 would be required. This is clearly difficult to achieve, but at least sets an upper limit to the Q-factor. The reason the upper limit is important would be more clear if the sample had a T2 of say 0.2 μs, leading to spin decay rate of 10/μs. The ideal Q in this case would be 5,700. Any higher Q would only interact with a narrower distribution of spins.

Once a cavity has been obtained having an effective magnetic mode volume matching the volume of the masing medium, a maser capable of continuous masing at room temperature can then be produced by the following steps (in which steps 3-5 all essentially take place concurrently):

Step 1: Mount the crystal (i.e. the masing medium) inside the resonant element (e.g. sapphire ring), thereby forming a resonator structure.

Step 2: Mount the resonator structure within the cavity, preferably in an adjustable manner (e.g. using rotatable means such as a hollow quartz tube as discussed above) to permit alignment of an axis defined by the NV centres of the masing medium (e.g. the [111] direction of diamond) with an applied magnetic field-e.g. using electron paramagnetic resonance (EPR) spectroscopy.

Step 3: Arrange a source of optical pumping (e.g. a laser beam) to optically pump the masing medium (e.g. by directing the laser beam along the hollow centre of the quartz tube).

Step 4: Provide an input and output of microwave energy in the proximity of the resonant structure, such that coupling can take place.

Step 5: Apply a static magnetic field parallel to the axis defined by the active NV centres of the masing medium, to satisfy the condition of stimulated emission for masing.

Summary

The present work provides a maser comprising:

A resonant element which includes a masing medium, the masing medium comprising a material with spin-defect centres (for example, but not limited to, nitrogen-vacancy centres in diamond or silicon vacancies in silicon carbide).

A microwave cavity exhibiting a resonance of sufficiently high Q-factor required for maser oscillation (or narrow-band amplification using a cavity) to occur. The magnetic Purcell factor, which is the Q-factor divided by the electromagnetic mode volume, is a key parameter. Accordingly, the microwave cavity should be sufficiently small, with an effective magnetic mode volume similar to the volume of the masing medium.

The masing medium is optically pumped into the triplet state by exposure to light in the form of a (flash/arc) lamp or laser, where by applying a magnetic field, the levels of the triplet state are separated by a frequency equal to that of the cavity's high-Q mode.

The present invention enables continuous masing to be achieved at room temperature by using materials (e.g. sapphire and diamond) with a high melting point (in excess of 500° C.) such that the material can withstand the heat generated by the pumping from the light source without frequency drifts. We note that diamond has a fairly low temperature coefficient of frequency of around −9 ppm/K [7].

As discussed above, pre-existing masing methods (prior to 2012) required the application of cryogenic cooling and large magnetic fields. An advantage of the present invention over such prior art is that no refrigeration is required. More recent developments [1,2] have presented a maser amplifier/oscillator that works at room temperature, thus not requiring a cumbersome means of refrigeration.

Because the masing species is optically pumped, the maser's excess noise temperature can be (considerably) lower than its nominal thermodynamic temperature. However, the masing species described in [1] and [2] is an organic molecule (pentacene) in an organic host (p-terphenyl) and a major disadvantage is one of temperature performance. Under laser pumping, continuous mode operation is not possible due to the temperature build up under the pump laser that causes severe degradation of the organic species.

Further, although stimulated emission had been seen in both diamond (NV centres) [5,6,7] and silicon carbide (Si vacancy defects) [8] in the past, no maser oscillation had ever been observed. Surprisingly, however, in the present work we have found that under certain conditions masing is indeed possible and what is more can be continuous. The thermal conductivity and the chemical composition which results in a relatively high melting/dissociation temperature of e.g. diamond or SiC overcome the disadvantages associated with the low melting points of the room temperature masing materials such as pentacene.

Further Examples of Room-Temperature Diamond Masers

Detailed embodiments have been described above, together with some possible modifications and alternatives. As those skilled in the art will appreciate, a number of additional modifications and alternatives can be made to the above embodiments whilst still benefiting from the inventions embodied therein. Some such modifications and alternatives will now be discussed.

1) Diamond Maser with Sapphire Braga Reflectors (Very High Q)

The very high-Q route is best pursued when using a diamond with low NV concentration and hence narrow spin linewidths. In this case, a high-Q resonator would be advantageous in order to match the linewidths and achieve the optimum performance. One possible route to very high-Q is by employing a dielectric mirror (in fact a quarter-wave Bragg reflector) consisting of a thin cylindrical shell (made e.g. of sapphire) placed around the dielectric resonator. This would have the effect of reducing conductor losses, but due to its larger dimensions and complexity would introduce many other modes. The solution to this is to design the resonator using state-of-the-art modelling to engineer the modal frequency distribution in order to move unwanted modes away from the high-Q mode. A sapphire dielectric resonator/Bragg reflector such as this has been modelled to have a Q-factor in the region of 100,000 at 9.7 GHz and a mode volume of 0.1 cm$^3$.

2) Diamond Masers with Low Mode-Volume and Low-Q

Resonators with low mode-volume inherently have much lower Q-factors. To realise a low mode-volume resonator requires miniaturisation. This can be achieved in a number of ways: the use of high permittivity dielectrics in dielectric resonators or metallic/dielectric structures consisting of metallic structures augmented by dielectrics to reduce their resonant frequencies. The use of metallic structures lowers Q-factors significantly compared to dielectric resonators but affords much lower mode-volumes due to miniaturisation.

2a) High-Permittivity Dielectric Resonators (High-Q)

This example uses the high permittivity of a dielectric in order to increase the magnetic Purcell factor. Although sapphire has a reasonable permittivity of ~9, there are materials with higher permittivity that still exhibit low losses. Examples of suitable single-crystal dielectrics were given in [2] such as Lanthanum Aluminate (LaAiO$_3$), Strontium Titanate (SrTiO$_3$), Potassium Tantalate (KTaO$_3$), rutile Titanium Dioxide (TiO$_2$). Polycrystalline ceramics based on solid solutions are also available with attractive properties, such as BMT (Barium Magnesium Tantalate), BZT (Barium Zinc Tantalate) and BZN (Barium Zinc Niobate). These latter ceramic materials also have the added advantage that they are temperature stable, exhibiting very low temperature coefficients of permittivity that once placed inside metallic cavities can realise dielectric resonators with zero temperature coefficient of resonant frequency. Other candidate dielectric materials include solid solutions of Calcium Titanate (CaTiO$_3$) and rare earth aluminates, etc. The key parameters here are the electrical permittivity which reduces the mode volume and the Q-factor. Together, these two parameters yield the magnetic Purcell factor.

More particularly, the mode volume $V_m$ of a dielectric resonator is inversely proportional to the cube of the square root of the relative electric permittivity $\varepsilon_r$: $V_m \propto \varepsilon_r^{-3/2}$. The Q-factor however is generally lower for higher permittivity dielectrics. For example, the dielectric Q-factors at 10 GHz of sapphire ($\varepsilon_r$~9) and Strontium Titanate ($\varepsilon_r$~320) are 80,000 and 1,500 respectively-yet their respective magnetic Purcell factors would be 10$^3$ and 10$^4$.

Example—Strontium Titanate

A Strontium Titanate (STO) dielectric resonator with a Q-factor of 1,500 at 9.5 GHz would have a mode volume of 0.6 mm$^3$ and could house a diamond sample with realistic physical dimensions of 0.5×0.5×1.5 mm$^3$. The low Q-factor would permit all three NV resonance lines to be addressed by the resonator mode, thus further lowering the optical pump threshold by a factor of 3. Coupled with an order of magnitude increase in the magnetic Purcell factor, the optical pumping threshold for maser oscillation would be approximately 3% of an equivalent high-Q sapphire resonator, i.e. 1 W, instead of 40 W (as predicted by Jin et al. [3]). This level of continuous optical power is achievable using readily available diode-pumped solid-state green lasers. It should, however, be borne in mind that STO has a very high temperature coefficient of permittivity, that would make a maser device very sensitive to fluctuations in temperature.

Example—Barium Magnesium Tantalate

Barium magnesium tantalate (BMT) is a ceramic solid-solution microwave dielectric with relative permittivity ~24 and a high Q-factor (50,000 at 10 GHz). It has a very low temperature coefficient of permittivity which when placed within a metallic cavity can produce a resonator with zero temperature coefficient of frequency. A maser cavity could be constructed from a BMT ring with OD 7 mm, ID 1.5 mm and height 3 mm, placed within a metallic highly-conductive cavity (copper, silver etc) with diameter 24 mm and height 15 mm. The cavity resonator would have a temperature coefficient of frequency close to zero. The Q-factor of the resonator would be in the region of 50,000 at 9.2 GHz with a mode volume of 24 mm$^3$. The magnetic Purcell factor (Q/V$_m$) would be in the region of 3×10$^6$ cm$^{-3}$ (an order of magnitude higher than the sapphire resonator).

A further example of a high-permittivity dielectric resonator would be a composite sapphire/titania (alumina/rutile) resonator 2b) Split-Ring/Hairpin/Loop-Gap (Metallic) Resonators Dielectric resonator based masers are limited with respect to the properties of the available dielectric materials. A different realisation of a low mode volume, high Q-factor resonator would be to employ metallo-dielectric structures, such as the split-ring, hairpin or loop-gap structures disclosed in WO 2013/175235 A1.

Such structures enable further miniaturisation by permitting enhancement of the magnetic inductive coupling inherent in metallic loop structures and electrical capacitance in small gap between metallic structures, augmented by high permittivity dielectric materials. A split-ring or loop-gap type resonator consisting of a metallic patterned film or wire coupled with a high permittivity dielectric material or substrate can allow a resonator with very small mode volume to be realised with a Q-factor ~100. This room-temperature maser could be easily integrated into a microwave circuit.

A hairpin resonator could consist of a folded high-conductivity metallic strip such as copper; enclosing the diamond sample within such a folded strip offers a reasonably high Q-factor (1,000 at 3.5 GHz) and a small mode volume with a high magnetic filling factor.

Another advantage of using low-Q factor, small mode volume resonators is that the homogeneity of the applied magnetic field is less critical.

3) Efficient Optical Pumping of Diamond by Continuous-Wave Laser

For diamond media containing low concentrations of NV-centres, the optical absorption is low. For example, a $2\times2\times2$ mm$^3$ diamond containing ~$10^{12}$ NV-centres will only absorb a few percent of the incident optical power, i.e. only 50 mW absorbed for 1.3 W optical power incident. Although this is highly inefficient, the pump rate for individual NV-centres is fairly homogenous. Conversely, for a sample with a higher concentration of ~$10^{15}$ the optical depth is quite shallow, so only NV-centres close to the surface of the diamond are excited and with a sharp gradient of individual pump rates (pump rate is proportional to local optical intensity). It is envisaged that a NV-concentration that lies between these two extremes (i.e. in the range of $10^{12}$-$10^{15}$) will offer the best solution in terms of pumping efficiency and uniform pumping rate.

However, we have explored various means of increasing the efficiency in low concentration samples with a view to reducing the overall optical pumping power requirement. Possible solutions to this problem are:

Placing a single optical mirror or a dichroic mirror that reflects 532 nm light behind the diamond crystal in order to double the path length and increase absorption.

Figure 8:
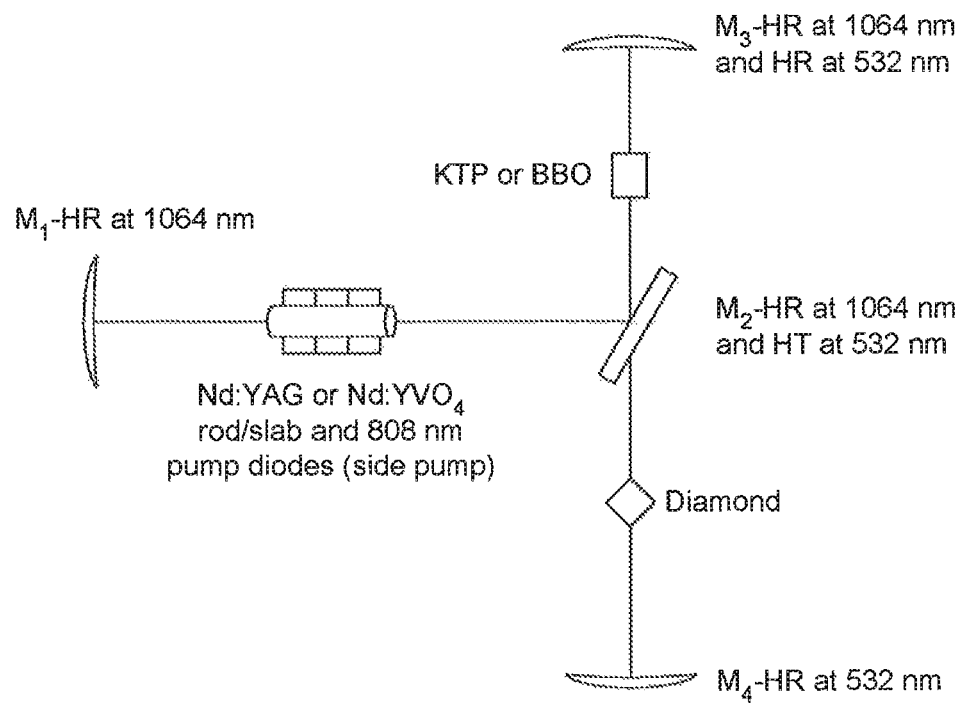
FIG. 8 illustrates an arrangement for laser pumping a diamond-containing optical laser cavity (intra-cavity diamond maser) to produce masing.

Construct an optical cavity comprising two or more plane-parallel or curved mirrors incorporating the diamond and a laser crystal, which can be for example a frequency doubling nonlinear crystal (such as KTP or BBO) that can be pumped from the side or end at a wavelength of 1064 nm (supplied by a 808 nm pumped Nd:YAG or Nd:YVO$_4$ crystal) to produce 532 nm (green) laser light (we note that 1064 nm may not be a particularly ideal wavelength since it is close to the infrared 1042 nm transition of the NV metastable singlet states $^1A_1$ and $^1E$). An example of such a cavity arrangement is illustrated in FIG. 8. The mirrors can be replaced with High Reflection (HR) or High Transmission (HT—i.e. anti-reflective) coatings on the respective crystal end faces. The L-shaped geometry illustrated can be changed into a linear one, especially in the case of laser crystal end-pumped configuration. Alternatively a phosphor such as Ce:YAG (slab geometry) which can be pumped from the side with blue laser diodes (445 nm) or InGaN LEDs (460 nm) could be used in order to generate light with a broader emission spectrum around 560 nm.

Coating the diamond with a reflective material (either metallic or dielectric for specular reflection or a white paint (possibly sprayable) for diffusive reflection). Metallic coatings may affect the quality factor of the maser resonator. We have implemented the white paint option with highly-reflective barium sulphate, painting all surfaces whilst leaving a window exposed for the incident laser beam. Diffusive (random) reflections can obviate the problem of preventing an incident laser beam from exiting the diamond crystal whilst only illuminating well-defined optical paths within the diamond. The reflected light will scatter in all directions ensuring a homogenous illumination and pump rate. However, this may also prevent red fluorescent light and infrared from escaping. An optical coating (akin to a dichroic mirror coating) that only reflects 532 nm may allow red light and infrared (thermal emission) to escape whilst reflecting green light.

Ensuring that the polarization of the incident optical laser beam is p-polarized with respect to the plane of incidence of the diamond and that the angle is as close to the Brewster angle as possible (to ensure maximum optical transmission).

REFERENCES

[1] Oxborrow, M., Breeze, J. D. & Alford, N. McN. Room-temperature solid-state Maser. *Nature* 488, 353-356 (2012).

[2] Breeze, J. D. et al. Enhanced magnetic Purcell effect in room-temperature masers. *Nature Communications* 6:6215 (2015).

[3] Jin, L. et al. Proposal for a room-temperature diamond maser. *Nature Communications* 6:8251 (2015).

[4] Loubser, J. & van Wyk, J. Electron spin resonance in the study of diamond. Reports on Progress in Physics 41, 1201 (1978).

[5] Poklonski, N., Lapchuk, N. & Lapchuk, T. Inverted epr signal from nitrogen defects in a synthetic diamond single crystal at room temperature. *JETP letters* 80, 748-751 (2004).

[6] Poklonski, N. et al. Nitrogen-doped chemical vapour deposited diamond: a new material for room-temperature solid state maser. *Chinese Physics Letters* 24, 2088 (2007).

[7] Le Floch, J.-M. et al. Electromagnetic properties of polycrystalline diamond from 35K to room temperature and microwave to terahertz frequencies. *Journal of Applied Physics* 109, 094103 (2011).

[8] Kraus, H. et al. Room-temperature quantum microwave emitters based on spin defects in silicon carbide. *Nature Physics* 10, 157-162 (2014).

The invention claimed is:

1. Apparatus for achieving masing at room temperature, the apparatus comprising:
    a microwave cavity which exhibits a resonance of sufficiently high Q-factor for maser oscillation;
    a resonator structure comprising a masing medium located within a resonant element, wherein the masing medium comprises spin-defect centres, the resonator structure being disposed within the microwave cavity;
    a magnet for applying a magnetic field across the masing medium;
    an input of microwave radiation to be amplified, the input of microwave radiation being coupled to the resonator structure; and
    an optical pump for optically pumping the masing medium and thereby causing stimulated emission of microwave photons;
    wherein the microwave cavity has a magnetic mode volume of the order of 0.1 cm$^3$.

2. The apparatus according to claim 1, wherein the masing medium comprises diamond containing nitrogen-vacancy spin-defect centres.

3. The apparatus according to claim 1, wherein the masing medium comprises silicon carbide containing silicon-vacancy spin-defect centres.

4. The apparatus according to claim 1, wherein the resonant element comprises a sapphire ring.

5. The apparatus according to claim 1, wherein the masing medium is aligned such that an axis defined by the spin-defect centres is parallel to the applied magnetic field; and optionally, wherein the axis defined by the spin-defect centres is the direction of the masing medium.

6. The apparatus according to claim 5, further comprising an adjustment device for adjusting the orientation of the masing medium within the microwave cavity when the microwave cavity is closed; and optionally, wherein the adjustment device comprises a rotatable shaft on which the resonator structure is mounted; for example, wherein the rotatable shaft comprises a hollow tube, wherein the resonator structure is mounted at an end of the hollow tube, and wherein the optical pump is arranged to provide the optical pumping along the hollow tube.

7. The apparatus according to claim 1, wherein the resonant element further comprises a high permittivity dielectric or a metallo-dielectric structure such as a split-ring, hairpin or loop-gap structure.

8. The apparatus according to claim 1, wherein the resonator structure is configured to address three spin-defect resonance lines of the spin-defect centres;
and/or wherein the optical pump is configured to pump the masing medium into a triplet state.

9. The apparatus according to claim 1, further comprising a mirror behind the masing medium, so as to double the path length of the optical pumping.

10. The apparatus according to claim 1, further comprising two or more mirrors incorporating the masing medium and a laser crystal.

11. The apparatus according to claim 1, wherein the masing medium is coated with a reflective material.

12. The apparatus according to claim 1, wherein the optical pump is arranged such that the polarization of the incident light on the masing medium is p-polarized with respect to the plane of incidence of the masing medium, and the angle of incidence is at substantially the Brewster angle.

13. A method of producing masing at room temperature, the method comprising:
disposing, within a microwave cavity which exhibits a resonance of sufficiently high Q-factor for maser oscillation, a resonator structure comprising a masing medium located within a resonant element, wherein the masing medium comprises spin-defect centres;
applying a magnetic field across the masing medium;
providing an input of microwave radiation to be amplified, the input of microwave radiation being coupled to the resonator structure; and
optically pumping the masing medium and thereby causing stimulated emission of microwave photons;
wherein the microwave cavity has a magnetic mode volume of the order of 0.1 cm$^3$.

14. The method according to claim 13, wherein the masing medium comprises diamond containing nitrogen-vacancy spin-defect centres, or wherein the masing medium comprises silicon carbide containing silicon-vacancy spin-defect centres; and/or
wherein the resonant element comprises a sapphire ring.

15. The method according to claim 13, further comprising aligning the masing medium such that an axis defined by the spin-defect centres is parallel to the applied magnetic field; and optionally, wherein the axis defined by the spin-defect centres is the direction of the masing medium.

16. The method according to claim 15, wherein the aligning is performed when the cavity is closed; and optionally, wherein the aligning is performed by rotating a shaft on which the resonator structure is mounted; for example, wherein the shaft comprises a hollow tube, wherein the resonator structure is mounted at an end of the hollow tube, and wherein the masing medium is optically pumped along the hollow tube.

17. The method according to claim 13, wherein the resonator structure addresses three spin-defect resonance lines of the spin-defect centres; and/or wherein the optically pumping pumps the masing medium into a triplet state; and/or wherein the masing is continuous.

18. The method according to claim 13, further comprising a preliminary process of designing and manufacturing, or otherwise obtaining, the microwave cavity such that, in respect of a given masing medium, the microwave cavity exhibits a resonance of sufficiently high Q-factor for maser oscillation using the gain medium, the preliminary process comprising:
measuring the sample volume of the masing medium and the concentration of spin-defect centres within the masing medium to estimate the optical pumping rate required; and
designing and manufacturing, or otherwise obtaining, the microwave cavity with dimensions such as to give a small effective magnetic mode volume similar to the volume of the masing medium, and in which the masing medium can be mounted within the resonant element.

19. The method according to claim 13, further comprising doubling the path length of the optical pumping using a mirror behind the masing medium; or
further comprising arranging two or more mirrors to incorporate the masing medium and a laser crystal; or further comprising coating the masing medium with a reflective material; or, wherein the optically pumping is such that the polarization of the incident light on the masing medium is p-polarized with respect to the plane of incidence of the masing medium, and the angle of incidence is at substantially the Brewster angle.

* * * * *